US009148528B2

(12) United States Patent
Sudan

(10) Patent No.: US 9,148,528 B2
(45) Date of Patent: Sep. 29, 2015

(54) METHOD AND SYSTEM FOR COMPRESSING AND EFFICIENTLY TRANSPORTING SCALABLE VECTOR GRAPHICS BASED IMAGES AND ANIMATION OVER LOW BANDWIDTH NETWORKS

(75) Inventor: Madhu Sudan, New Delhi (IN)

(73) Assignee: Hughes Systique Private Limited, Delhi (IN)

( * ) Notice: Subject to any disclaimer, the term of this patent is extended or adjusted under 35 U.S.C. 154(b) by 363 days.

(21) Appl. No.: 13/172,662

(22) Filed: Jun. 29, 2011

(65) Prior Publication Data
US 2012/0163724 A1 Jun. 28, 2012

(30) Foreign Application Priority Data
Jun. 30, 2010 (IN) .......................... 1535/DEL/2010

(51) Int. Cl.
*G06K 9/36* (2006.01)
*H04N 1/00* (2006.01)
*H04W 4/18* (2009.01)
*H04W 28/06* (2009.01)

(52) U.S. Cl.
CPC ....... *H04N 1/00106* (2013.01); *H04N 1/00108* (2013.01); *H04W 4/18* (2013.01); *H04W 28/06* (2013.01)

(58) Field of Classification Search
None
See application file for complete search history.

(56) References Cited

U.S. PATENT DOCUMENTS

| 7,756,536 | B2 | 7/2010 | Camp, Jr. | |
|---|---|---|---|---|
| 2002/0176418 | A1* | 11/2002 | Hunt et al. | 370/389 |
| 2004/0078453 | A1* | 4/2004 | Bhogal et al. | 709/219 |
| 2006/0227047 | A1* | 10/2006 | Rosenberg | 342/357.13 |
| 2007/0232223 | A1* | 10/2007 | Bilange | 455/3.06 |
| 2008/0063114 | A1* | 3/2008 | Joung et al. | 375/298 |

OTHER PUBLICATIONS

Andersson et al., "Mobile SVG Profiles: SVG Tiny and SVG Basic," W3C Recommendation, Jan. 14, 2003, http://www.w3.org/TR/SVGMobile/, 55 pages.
Wikipedia, "Short Message Service," http://en.wikipedia.org/wiki/short_message_service, archived May 4, 2011, 9 pages.
"Document Structure," SVG 1.1 (Second Edition) Aug. 16, 2011, http://www.w3.org/TR/SVG11/struct.html, 34 pages.

* cited by examiner

*Primary Examiner* — Chan Park
*Assistant Examiner* — Eueng-Nan Yeh
(74) *Attorney, Agent, or Firm* — Klarquist Sparkman, LLP

(57) ABSTRACT

Methods and systems for transferring vector data over a plurality of networks is disclosed. A system includes one or more encoding device(s), the device having a processor configured to convert a vector data in a first standard format into a compressed vector data in a micro format. A plurality of message centers are coupled with said encoding device(s) and comprise a processor configured to receive and temporarily store said compressed vector data in the micro format. One or more decoding device(s) residing at a plurality of handheld units are coupled with said message centers and are configured to receive said compressed vector data in said micro format, said decoding device(s) comprising a processor and configured to convert said compressed vector data in said micro format into the vector data in said first standard format and to render the vector data in said first standard format over said handheld units.

20 Claims, 2 Drawing Sheets

Network data flow architecture for transferring compressed format of the present invention over a SMS channel

STRUCTURE OF THE MICRO-SVG FORMAT
OF THE PRESENT INVENTION

EXEMPLARY STRUCTURE OF THE MICRO-SVG FORMAT
OF THE PRESENT INVENTION

Network data flow architecture for transferring compressed format of the present invention over a SMS channel

METHOD AND SYSTEM FOR COMPRESSING AND EFFICIENTLY TRANSPORTING SCALABLE VECTOR GRAPHICS BASED IMAGES AND ANIMATION OVER LOW BANDWIDTH NETWORKS

FIELD OF TECHNOLOGY

The instant invention generally relates to the field of efficient transmission of vector graphics over a mobile network and more particularly relates to an extremely compressed, scalable vector graphics format for rendering two-dimensional vector graphics objects over low bandwidth networks.

BACKGROUND

Scalable Vector Graphics (SVG) relates to a family of specifications of an XML-based file for describing two-dimensional vector graphics, both static and dynamic (i.e. interactive or animated).

Scalable Vector Graphics (SVG) is particularly suited for publishing rich content on mobile devices. This is because SVG allows for a compact representation of vector graphics. SVG can be scaled to arbitrary sizes eliminating the problem associated with screen dimension proliferation on mobile devices. With SVG, graphics appear equally well across multiple screen sizes. These scalable graphics do not have any inherent pixel size and hence they can be scaled very easy. Thus, SVG is resolution independent and uses less bandwidth.

Also, SVG graphics can easily be animated, made interactive, and styled and/or formatted. These attributes take SVG's capabilities beyond the scope of any previously existing graphic standard.

However, while the SVG format provides several benefits as stated above, since it is XML based, a typical SVG description is too verbose when it comes to transmission of the description over restricted networks such as mobile networks. To address this problem, Tiny & Basic SVG (http://www.w3.org/TR/SVGMobile/) was developed. However, while these formats reduce the total size compared to regular SVG and may be appropriate for an HTTP based (GPRS/3G) mobile transport, it is still too big when such images need to be transmitted over SMS messages. Transmitting a Tiny or Basic SVG over SMS would take several SMS messages making it non-optimal.

The invention described herein presents a significantly more compressed version of SVG than the aforementioned efforts which is suitable for delivery over severely limited transport mechanisms such as SMS (in addition to being applicable for HTTP transport mechanisms)

SUMMARY

According to an embodiment of the present invention a system for transferring vector data over a plurality of networks is provided, comprising of one or more encoding device(s), the device having a processor configured to convert a vector data represented in a first standard format into a compressed vector data represented in a micro format; a plurality of message centres communicatively coupled with said encoding device(s) and comprising of a processor configured to receive and temporarily store said compressed vector data represented in said micro format; one or more decoding device(s) residing at a plurality of handheld units communicatively coupled with said message centres and configured to receive said compressed vector data represented in said micro format from the message centres, said decoding device(s) comprising of a processor configured to convert said compressed vector data represented in said micro format into the vector data represented in said first standard format and to render the vector data represented in said first standard format over said handheld units.

An embodiment of the present invention provides highly compressed format for rendering two-dimensional vector graphics, both static and dynamic.

In another embodiment, the highly compressed format of the present invention allows efficient transfer of data over low bandwidth networks, such as the existing SMS network.

In another embodiment, the highly compressed format of the present invention allows efficient transfer of data over other network channels like GPRS.

In another embodiment, the compressed format of the present invention is an intermediate format that can be translated back to Scalable Vector Graphics (SVG).

In another embodiment the compressed format of the present invention is encoded for copying and securing contents.

In another embodiment the present invention provides a system for transferring vector data over a plurality of networks such that the count of bits and attributes for said micro format is determined as $2^N$, said N predefined as number of bits for a tag and an attribute respectively.

In another embodiment the present invention also provides a corresponding method for transferring vector data over a plurality of networks, the method comprising the steps of converting a vector data represented in a first standard format into one or more compressed vector data represented in a micro format by a configured processor of one or more encoding device(s); receiving and temporarily storing said compressed vector data represented in said micro format by a configured processor of plurality of message centres, said message center communicatively coupled with said encoding device(s); receiving said compressed vector data represented in said micro format from the message centers by one or more decoding device(s) residing at a plurality of handheld units communicatively coupled with said message centers; converting said compressed vector data represented in said micro format into the vector data represented in said first standard format by a configured processor of said decoding device(s); and rendering the vector data represented in said first standard format over said handheld units by the configured processor of said decoding device(s).

DETAILED DESCRIPTION

The various features of the preferred embodiment of present invention together with its objects and advantages thereof may be best understood by reference to the description taken in conjunction with the accompanying schematic drawing(s) of the architecture.

Figure 1:
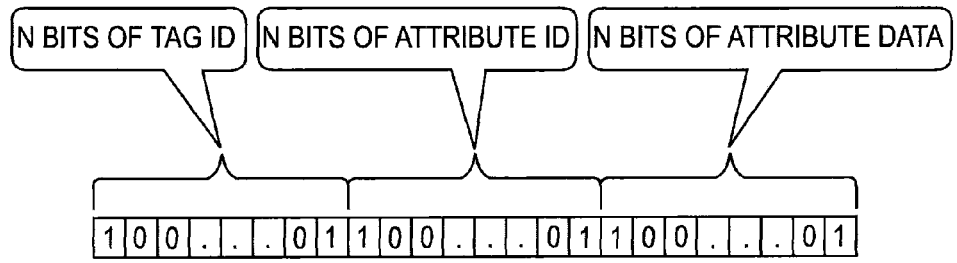
FIG. 1 illustrates a basic structure of the micro-SVG format of the present invention.

FIG. 1 illustrates an exemplary structure of the micro-SVG format of the present invention. The micro-SVG format comprises of SVG Tags, Attributes and their values. Each tag/ attribute is uniquely identified with a number which can store in n bits, where the value of n depends upon number of tags/attributes supported by encoder and decoded.

The micro SVG format of the present invention is of extremely small size, offering a highly compressed file format in the order of 500% compression. Because of its small size a micro-SVG data both dynamic/animated and static can be sent as one or two SMS over a low bandwidth network.

In a typical structure of the micro-SVG format of the present invention, as illustrated in FIG. 1, predetermined no. of 'n' bits are used to represent bits of a Tag Id, bits of an attribute ID, and bits of an attribute data.

Figure 2:
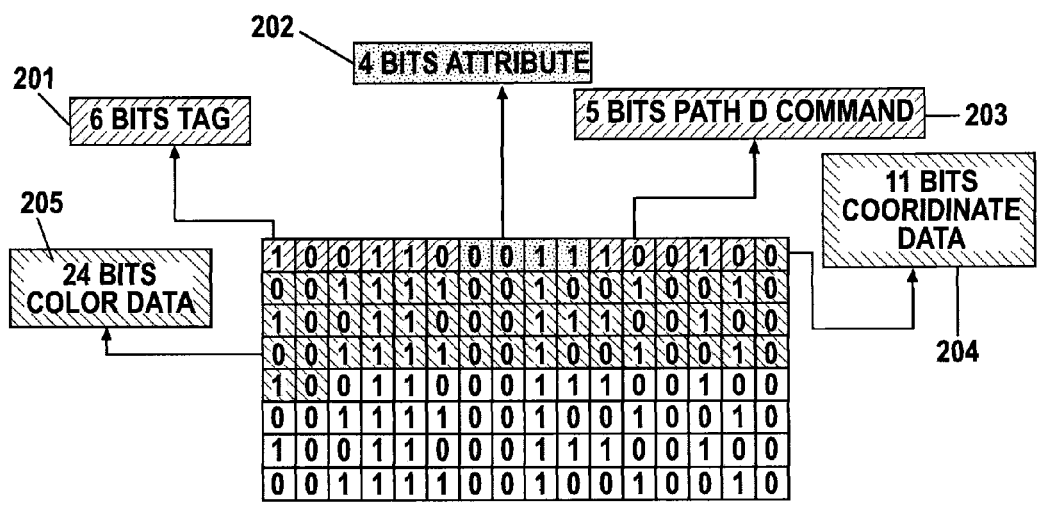
FIG. 2 illustrates an exemplary implementation of the micro-SVG format of the present invention.

Now referring to FIG. 2, to explain exemplary implementation of micro-SVG format, this implementation of micro-SVG format comprises of 6 bits [201] for tag (supporting up to 64 unique tags), 4 bits [202] for attribute supporting up to 16 unique attributes) for each tag, 5 bits [203] for path command, 11 bits [204] for coordinate data and 24 bits [205] of color data.

A micro-SVG encoder [305] is configured to convert a standard SVG format/file [304] in to an extremely compressed format (micro SVG format) [306] of the present invention.

Similarly, a micro-SVG decoder is used to decode micro-SVG format of the present invention into a standard SVG format. The micro SVG decoder is also configured to render a decoded SVG file using components (such as JSR-226) for mobile SVG on mobile handsets. In typical embodiments of the present invention, decoding device(s) reside over server units.

Figure 3:
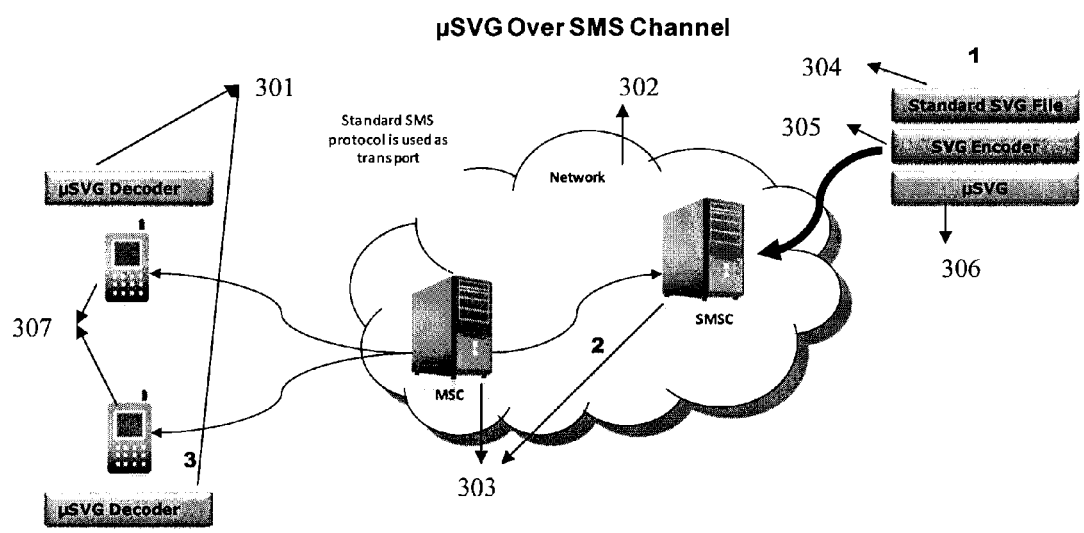
FIG. 3 illustrates an exemplary network data flow for transferring compressed format of the present invention over existing SMS infrastructure.

Now referring to FIG. 3, to explain exemplary network data flow for transferring compressed format i.e. micro-SVG format of the present invention over a existing SMS infrastructure.

Because of its small size, a micro-SVG format is easily transferable on a predefined SMS channel. The typical transfer of a micro-SVG format is easily makes use of following components:
  Author—which is a web-based IDE to create and deploy rich GUI contents like Mobile Advertisement
  Deployment server: comprises of micro-SVG encoder and other components.
  Micro SVG engine; comprises of micro-SVG decoder and viewer.

A standard SVG file [304] is converted into a micro-SVG based file [306] using a SVG encoder [305]. Thereafter, such compressed micro-SVG based file [306] is transferred over a network [302] via Short message Service Centers (SMSC) and/or Mobile Service Centers [303]. Standard SMS protocol is used for said transfer over the network.

In a typical scenario, vector data is transferred over a plurality of networks, wherein one or more encoding device(s) comprise of a processor configured to convert a vector data represented in a first standard format into a compressed vector data represented in a micro format. Also, a a plurality of message centres are communicatively coupled with said encoding device(s) and comprise of a processor configured to receive and temporarily store said compressed vector data represented in said micro format.

On the other side, micro-SVG decoders [301] are loaded over mobile handsets [307] to decode micro-SVG format in to the standard SVG format and display the same on mobile handsets [307].

Thus, one or more decoding device(s) reside at a plurality of handheld units communicatively coupled with said message centres and are configured to receive said compressed vector data represented in said micro format from the message centres. The decoding device(s) also comprise of a processor configured to convert said compressed vector data represented in said micro format into the vector data represented in said first standard format Also, the decoding device(s) are also configured to render the vector data represented in said first standard format over the handheld units.

Further, micro-SVG can be used to send dynamic images and animations by deploying Mobile Interactive Application over SMS. Also, micro-SVG can be configured to work for MAP and navigation Applications and for real time location/tracking application.

The present invention is not intended to be restricted to any particular form or arrangement, or any specific embodiment, or any specific use, disclosed herein, since the same may be modified in various particulars or relations without departing from the spirit or scope of the claimed invention herein shown and described of which the apparatus or method shown is intended only for illustration and disclosure of an operative embodiment and not to show all of the various forms or modifications in which this invention might be embodied or operated.

I claim:

1. A system for transferring vector graphics data over one or more networks, said system comprising:
   an encoding device comprising a processor configured to convert a vector graphics data represented in a standard format into a compressed vector graphics data, wherein said compressed vector graphics data includes a number comprising a tag ID indicating a tag in the standard format, a number comprising an attribute ID indicating an attribute in the standard format, and a number comprising attribute data in the standard format, wherein a number of tag IDs and a number of attribute IDs vary depending on a bandwidth of the network, and wherein said compressed vector graphics data conforms to payload of fewer than three short message service messages; and
   a decoding device communicatively coupled with said encoding device configured to receive said compressed vector graphics data, said decoding device comprising a processor configured to convert said compressed vector data into the vector data represented in said standard format.

2. A system for transferring vector graphics data over one or more networks as claimed in claim 1, wherein said decoding device resides over server units.

3. A system for transferring vector graphics data over one or more networks as claimed in claim 1, wherein said compressed vector graphics data is configured to work in coordination with MAP and navigation applications and for real time location-tracking applications.

4. A system for transferring vector graphics data over one or more networks as claimed in claim 1, wherein said system allows transfer of vector graphics data over low-bandwidth networks and General Packet Radio Service (GPRS), said low-band width networks comprising a Short message Service network.

5. A system for transferring vector graphics data over one or more networks as claimed in claim 1, wherein said compressed vector graphics data is encoded for copying and securing contents of transferred data.

6. A system for transferring vector graphics data over one or more networks as claimed in claim 5, wherein said tags and attributes are identified with a predetermined number.

7. A system for transferring vector graphics data over one or more networks as claimed in claim 1, wherein one or more networks comprise short message service centers (SMSC) and mobile service centers.

8. A system for transferring vector graphics data over one or more networks as claimed in claim 1, wherein said compressed vector graphics data comprises scalable vector graphics tags, attributes, and their corresponding values.

9. A system for transferring vector graphics data over one or more networks as claimed in claim 1, wherein handheld units are configured to host an engine comprising said decoding device and a viewing unit.

10. A system for transferring vector graphics data over one or more networks as claimed in claim 1, wherein said one or more networks comprises low bandwidth channels, said low bandwidth channels comprising Short Message Service (SMS) channels and Hyper Text Transfer Protocol (HTTP) channels.

11. A method for transferring vector graphics data over a network, said method comprising:
    encoding a vector graphics data represented in a standard format into a compressed vector graphics data represented in a micro format, wherein the micro format comprises a number comprising a tag ID indicating a tag in the standard format, a number comprising an attribute ID indicating an attribute in the standard format, and a number comprising attribute data in the standard format formatting the compressed vector graphics data into a payload of fewer than three short messaging service messages, wherein a number of tag IDs and a number of attribute IDs vary depending on a bandwidth of the network; and
    sending the fewer than three short messaging service messages through a network.

12. A method for transferring vector graphics data over a network, as claimed in claim 11, wherein said micro format is configured for working in coordination with MAP and navigation applications and for real time location-tracking applications.

13. A method for transferring vector data over a plurality of networks, as claimed in claim 12, wherein said tags and attributes are identified with a predetermined number.

14. A method for transferring vector graphics data over a network, as claimed in claim 11, wherein said micro format is encoded for copying and securing contents of transferred data.

15. A method for transferring vector graphics data over a network, as claimed in claim 11, wherein the network comprises short message service centers (SMSC) and mobile service centers.

16. A method for transferring vector graphics data over a network, as claimed in claim 11, wherein said micro format comprises scalable vector graphics tags, attributes, and their corresponding values.

17. A method for transferring vector data over a plurality of networks, as claimed in claim 11, wherein the network comprises low bandwidth channels, said low bandwidth channels comprising Short Message Service (SMS) channels and Hyper Text Transfer Protocol (HTTP) channels.

18. One or more non-transitory computer-readable storage media having computer-executable instructions for causing a computer to perform a method of manipulating a scalable vector graphics image, the method comprising:
    receiving the scalable vector graphic image represented in a standard format;
    determining a count of tags and a count of attributes of the scalable vector graphic image supported by a network, wherein the count of tags and the count of attributes vary depending on a bandwidth of the network;
    with the count of tags and the count of attributes, encoding the scalable vector graphics image into a compressed vector graphics image represented in a micro format, the micro format including sequences of tag IDs, attribute IDs, and attribute data, wherein the tag IDs represent tags in the standard format and the attribute IDs represent attributes in the standard format;
    generating two or fewer short message service messages, wherein a payload of the messages comprises the entire compressed vector graphics image.

19. The one or more non-transitory computer-readable storage media of claim 18, wherein the scalable vector graphics image is dynamic.

20. The one or more non-transitory computer-readable storage media of claim 18, wherein the count of tags is 64 and the count of attributes is 16.

\* \* \* \* \*